March 25, 1969  M. MONTAGNANI ET AL  3,434,925
HEAT INSULATION FOR NUCLEAR REACTOR PRESSURE TUBES
Filed March 16, 1967

United States Patent Office 3,434,925
Patented Mar. 25, 1969

3,434,925
HEAT INSULATION FOR NUCLEAR REACTOR PRESSURE TUBES
Mario Montagnani, Bologna, and Flaviano Farfaletti-Casali, Milan, Italy, assignors to European Atomic Energy Community (Euratom), Brussels, Belgium
Filed Mar. 16, 1967, Ser. No. 623,634
Claims priority, application Italy, Mar. 31, 1966, 7,444/66
Int. Cl. G21c 5/12
U.S. Cl. 176—44          10 Claims

ABSTRACT OF THE DISCLOSURE

An insulated pressure tube for nuclear reactors and having two heat barriers, one inside and out outside of the pressure tube, serving to maintain the tube temperature within a permissible temperature range. The tube is formed of zirconium, beryllium, an alloy of one or both of these metals or other metals or alloys subject to creep at higher temperatures and ductile-to-brittle transition at lower temperatures both within the temperature gradient between the fuel within the tube and the temperature outside the tube during operation.

---

Figure 1:
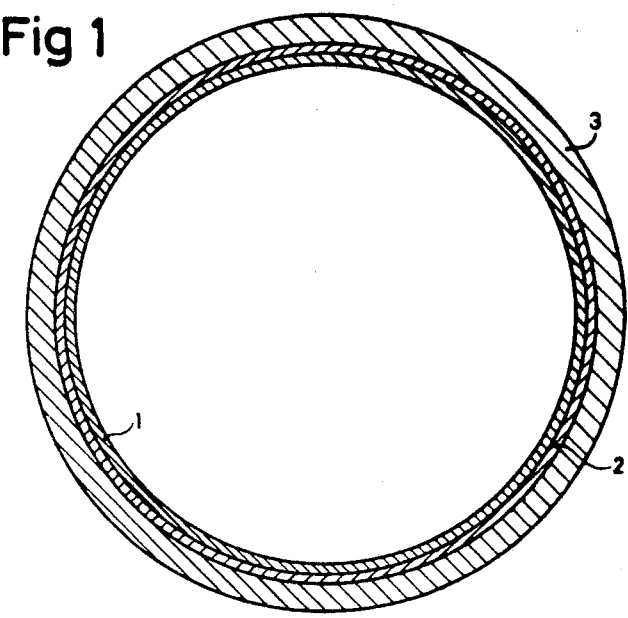

The invention relates to heat insulation for the pressure tubes of a nuclear reactor and is concerned with reactors having pressure tubes of zirconium or its alloys or of certain other metals or alloys as later mentioned.

In an organic-coolant cooled or water or vapour or mist or gas cooled reactor having zirconium alloy pressure tubes, there is an upper limit to the working temperature of the tube which is in direct contact with the coolant, the limit depending upon the creep strength of the alloy and, where applicable, upon hydriding of the alloy by the coolant, since hydriding, which may occur at elevated temperature in the presence of an organic coolant or water, embrittles the material once the hydride content of the alloy exceeds a particular threshold.

Consequently, the maximum working temperature of an organic-coolant cooled or water-cooled zirconium alloy pressure tube is around 300° C. There is also a lower working temperature limit for zirconium alloy pressure tubing, which lower limit is the ductile-to-brittle transition of the irradiated material, and is around 250° C. Clearly, therefore, the optimum working temperature for a zirconium alloy pressure tube is between 250° and 300° C. The upper limit is higher for gas reactors in which there is no hydrogen embrittlement problem and in which the temperature limit is determined by considerations of creep strength (except of course for $H_2$-cooled reactors). Previously, only the upper temperature limit has ever been considered since the bottom limit in the case of other materials was far enough away from the upper limit. For instance, the bottom limit for aluminium alloys and for many kinds of irradiated steel is below the minimum working temperature and there is therefore no lower temperature limit problem. Nor has any consideration previously been given to the fact that the ductile-to-brittle transition temperature for zirconium (Zr) alloys is much higher than for conventional constructional materials, so that the effective working temperature range is limited. This double temperature limitation is characteristic of Zr alloys and of some other materials, such as beryllium, which are used in nuclear engineering because of their low neutron absorption.

Consequently, for any conventional material, such as aluminium or steel and their alloys, all that is needed is to set an upper limit to working temperature and therefore to devise a heat insulation system inside the pressure tube which greatly reduces the temperature thereof, but with materials such as Zr and its alloys a double temperature limitation has to be considered. Therefore, in cases in which creep or hydriding requirements are not highly restrictive with conventional metals, such as steel, insulation may be provided only outside the tube, so that the tube becomes a hot pressure tube. What has so far been done with conventional materials—i.e. either only outside insulation or only inside insulation—does not touch the problem of double temperature limitation arising with materials such as Zr and Be and their alloys.

This invention relates to an insulation formed by two heat barriers, one inside and one outside the pressure tube, the barriers being adapted to maintain the tube temperature in the permissible temperature range. The insulation, allowing for the effect of hydriding and irradiation on embrittlement, gives very high thermal efficiency and very great reliability in operation.

The invention provides a nuclear reactor having pressure tubes of zirconium, beryllium or alloy of one or both or other metal or alloy subject to creep at an upper temperature and a ductile-to-brittle transition at a lower temperature both within the temperature gradient between the fuel within the tube and the temperature outside the tubes during operation, characterised by heat insulation both within and without the tubes operable to maintain the working temperature of the tubes between said upper and lower temperatures.

The invention also provides a nuclear reactor of the kind cooled by a hydriding fluid and having pressure tubes of zirconium, beryllium or alloy of one or both or other metal or alloy subject to embrittlement by the hydriding fluid at an upper temperature and a ductile-to-brittle transition at a lower temperature both within the temperature gradient between the fuel within the tubes and the temperature outside the tubes during operation, characterised by heat insulation both within and without the tubes operable to maintain the working temperature of the tubes between said upper and lower temperatures.

Thus the invention employs a heat insulation comprising a double heat barrier, the first such barrier being disposed inside the pressure tube and the second such barrier being disposed outside the pressure tube. The first heat barrier can be secured to the pressure tube interior or from a structural part of the fuel element and be rigidly connected thereto. The first barrier can be formed by layers of a material which has a low neutron absorption and low heat conductivity and which may or may not be impervious to the coolant, or by a gas space. The second heat barrier may be formed by a gas layer between the pressure tube and the calandria tube. These barriers should, in the case of zirconium tubes, maintain the pressure tube temperature between approximately 250° and 300° C. to prevent the formation of hydrides and to prevent embrittlement by irradiation.

The heat insulation forming the first heat barrier may take the form of a gas space zetween two concentric metal tubes. In a gas-cooled reactor, one of the two tubes can be the pressure tube. In an organic-liquid-cooled reactor, the gas in the space between the two tubes should be stagnant. The materials used for the tubes may be very thin steel or Be and Zr alloys. Zr alloys can be used even when rigidly connected to the fuel element, in which event the hydriding problems associated with long-term use do not arise.

Alternatively, the heat insulation forming the first heat barrier may be formed by an impervious graphite cylindrical member and by cylindrical circular ring sectors made of pyrolytic carbon and having their contacting sides in staggered or overlapping relationship and in slightly spaced relationship to allow free expansion of the sectors. The pyrolytic carbon can also be deposited in layer adhering to the graphite matrix.

According to another arrangement of the invention, the first heat barrier comprises an impervious graphite cylindrical body and a number of parallel layers adhering to cylindrical circular ring sectors of vitreous carbon, the sectors of any one layer being spaced apart from one another so as to be able to expand freely.

Some specific embodiments of the invention will now be described for an organic-liquid-cooled reactor in which the exit temperature of the organic solvent is above 300° C., up to a possible maximum of 400 C., and which is moderated with heavy water at a temperature of about 80° C.

The first heat barrier is placed on the fuel element between the element and the pressure tube, and the second barrier is placed outside the pressure tube between the tube and the heavy water. The first heat barrier can be embodied on the cylindrical periphery of the fuel elements and thus form a channel-filling element. The fuel elements should be stacked in the channel with their ends in contact so that the heat insulation forms a continuous barrier which also prevents any mixing between the coolant fluid flowing inside the fuel element and that part of the coolant fluid which is at a lower temperature and which flows in the space left between the fuel elements and the pressure tube.

There are various ways of embodying the first heat barrier of which examples are shown in the accompanying drawings in which:

FIGURE 1 shows the general solution which the invention provides to the problem, and FIGURES 2a, 2b, 3 and 4 show various solutions all based on the same principle of a double heat barrier.

Referring to FIGURE 1, there can be seen an inner heat barrier 1, a zirconium alloy pressure tube 2, and an outer heat barrier 3. Cooling fluid having an entry temperature of about 270° C. and an exit temperature of about 400° C. flows inside the system in contact with the fuel. Since, as already stated, the pressure tube is required to operate at a temperature between 250 and 300° C., the inner heat barrier should ensure that the entry temperature of the coolant is approximately maintained over the whole length of the pressure tube.

Figures 2A, 2B:
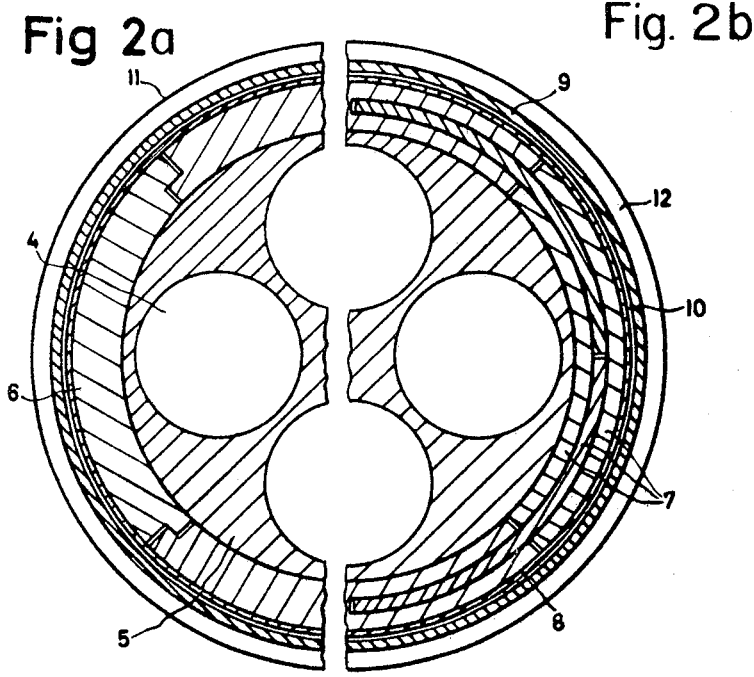

FIGURE 2a shows a first solution of the problem. Cylindrical fuel elements are introduced in spaces 4 in an impervious graphite cylinder 5. A first heat barrier 6 is placed outside the cylinder 5 and comprises four circular ring sectors of pyrolytic carbon with their contacting sides in staggered or overlapping relationship and with provision for free expansion of the sectors.

Instead of cylindrical sectors being used, the first barrier can, as seen at FIGURE 2a, be formed by layers 7 which are provided one inside the other to a number of two or three and which are made of vitreous carbon and which each comprises four or five elements spaced apart from one another to allow free expansion.

The whole is received in a zirconium alloy sheath 8, and a zirconium alloy pressure tube 9 is disposed outside and at a small distance 10 from the sheath 8. Some of the cooling fluid flows in the gap or space 10 between the sheath 8 and tube 9. The second barrier is formed by a calandria tube 11 and by a gas layer 12 which separates the tube 11 from the pressure tube 9.

In this embodiment, the first heat barrier, which is made of an impervious insulant can serve as a structural part of a fuel element as well as being a channel-filling element.

Figure 3:
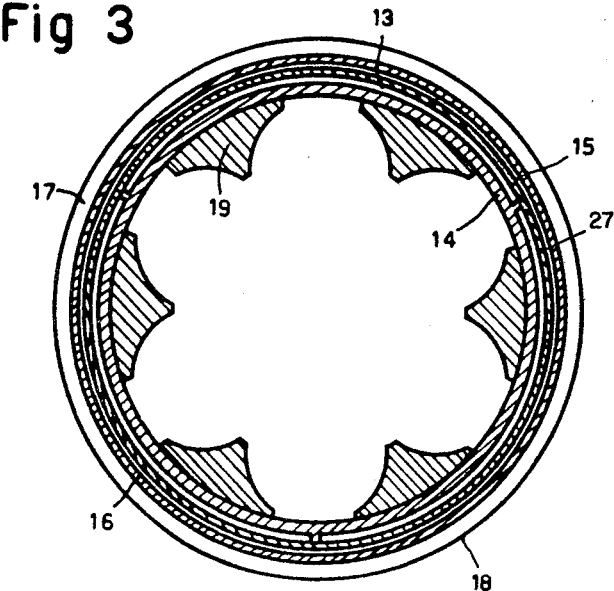

In FIGURE 3, the inner heat barrier takes the form of a fluid space 13 between two concentric beryllium or zirconium alloy tubes 14 and 15 which form a structural part of a fuel element together with impervious graphite blocks 19. A gap or space 27 is formed between tube 15 and pressure tube 16 into which some of the cooling fluid flows aiding in formation of the first heat barrier. Outside the zirconium alloy pressure tube 16 a gas layer 17 separates the same from the calandria tube 18 thus forming the second heat barrier.

Figure 4:
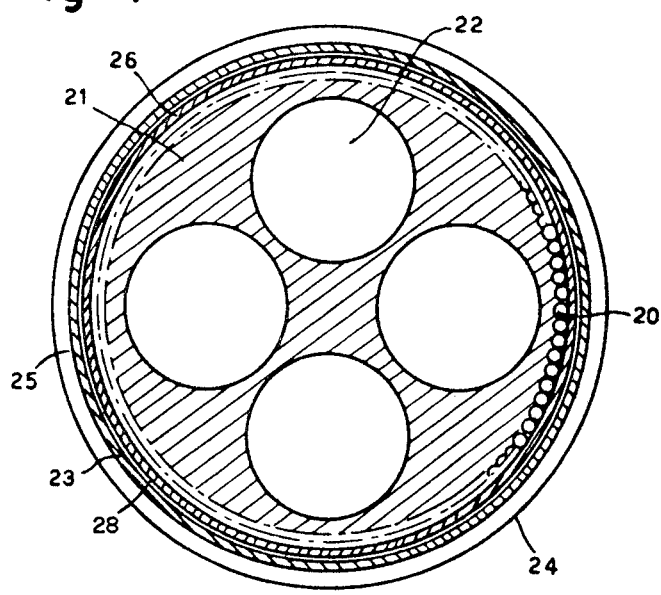

In solution shown in FIGURE 4, the inner heat barrier takes the form of a number of small gas-filled beryllium alloy tubes 20 located by a zirconium sheath on the periphery of a filling element formed by an impervious graphite block 21 adapted to receive the fuel elements in appropriate passages 22 and protected by a zirconium alloy sheath 26 along with the gap or space 28 formed between sheath 26 and pressure tube 23. Outside the zirconium alloy pressure tube 23 a gas layer 25 separates the same from the calandria tube 24.

In all the embodiments mentioned, there should be a minimum clearance between the filling element and the Zr alloy pressure tube, down to the extent permitted by working tolerances; in all embodiments there should be a slight flow of organic solvent in contact with the outside of the fuel element to prevent radiopyrolysis of the organic solvent.

The materials of use for embodying the channel-filling element and the first heat barrier in the various embodiments shown can be:

Non-insulating impervious graphite: morganite type or impregnated aluminium or magnesium;

Impervious pyrolytic or vitreous low-heat-conductivity carbon;

Impervious pyrolytic graphite having low radial heat conductivity;

Beryllium, zirconium and their alloys or metal alloys which can be used instead, even if with impaired neutron economy; and Vitreous silica or dense or porous ceramics.

The second heat barrier between the pressure tube and the heavy water is provided, in the various examples, by means of a lamina of gas separated from the heavy water by a thin tube of zirconia or aluminium or magnesium or steel alloy and forming the calandria tube. This tube can be corrugated at right-angles to its length to increase the transverse strength for a given wall thickness or to absorb differential longitudinal heat expansions; the calandria tube in this construction can also be a sufficiently thin steel tube whose thickness is of the order of 0.1 mm., since appropriate corrugations can make such a tube strong enough to withstand possible pressure differences between the insulant gas and the heavy water.

The invention is not of course limited to the embodiments hereinbefore described, and covers possible variants and modifications; more particularly, the general principle of this invention covers placing the first heat barrier inside the channel rigidly connected to the pressure tube instead of being placed on the fuel element.

What we claim is:

1. In a nuclear reactor having pressure tubes cooled by suitable cooling means including organic coolant, water in any of its phases, gas, and heavy water, an improved heat insulation for said pressure tube comprising a double heat barrier the first of which is inside the pressure tube and the second of which is outside said pressure tube, the first heat barrier comprising a structural part of the pressure tube and being rigidly connected thereto as well as at least partially filling said pressure tube, the first heat barrier being formed by a material having low neutron absorption and low heat conductivity, the second heat barrier being formed by a gas layer and a calandria tube which is substantially coaxial with but spaced from said pressure tube, the barriers maintaining the temperature of the pressure tube within a desired temperature range in order to prevent hydrogen diffusion, creep distortion and irradiation embrittlement.

2. In a nuclear reactor of the type according to claim 1, an improved heat insulation for pressure tubes wherein the first heat barrier is formed by an impervious graphite cylindrical member and cylindrical circular ring sectors of pyrolytic carbon with their contacting sides in overlapping and slightly spaced relationship to allow free expansion of the sectors, said sectors being concentric with said cylindrical member.

3. In a nuclear reactor of the type according to claim 1, an improved heat insulation for pressure tubes wherein the first heat barrier is formed by an impervious graphite cylindrical member and by a plurality of concentric layers of cylindrical circular ring sectors formed from material selected from the group consisting of vitreous carbon and pyrolytic carbon, the sectors of said layers being spaced apart to permit free expansion.

4. In a nuclear reactor of the type according to claim 1, an improved heat insulation for pressure tubes wherein the first heat barrier is formed by concentric tubes separated from one another by an insulating space, said tubes being formed from material selected from the group consisting of zirconium, beryllium, and their alloys.

5. In a nuclear reactor of the type according to claim 1, an improved heat insulation for pressure tubes wherein the first heat barrier is formed by an impervious graphite cylindrical member surrounded peripherally by a layer of stationary gas-filled tubes made from material selected from the group consisting of beryllium and its alloys.

6. In a nuclear reactor of the type according to claim 1, an improved heat insulation for pressure tubes wherein the calandria tube forming part of the second heat barrier is corrugated to increase transverse strength and to absorb differential longitudinal expansions.

7. In a nuclear reactor of the type according to claim 1, an improved heat insulation for pressure tubes wherein said heat insulation is operable to maintain the temperature of said pressure tube between 250° C. and 300° C. in operation.

8. In a nuclear reactor of the type according to claim 1, in which said pressure tubes are formed from a material selected from the group consisting of metals and alloys subject to embrittlement by the hydriding fluid at an upper temperature and a ductile-to-brittle transition at a lower temperature both within the temperature gradient between the fuel within the tubes and the temperature outside the tubes during operation.

9. In a nuclear reactor of the type according to claim 1, in which said pressure tubes are formed from a material selected from the group consisting of zirconium and its alloys.

10. In a nuclear reactor of the type according to claim 1, in which said pressure tubes are formed from a material selected from the group consisting of beryllium and its alloys.

References Cited

UNITED STATES PATENTS

| 3,231,339 | 1/1966 | Murthy et al. | 165—136 X |
| 3,280,003 | 10/1966 | Alfille et al. | 176—64 X |

FOREIGN PATENTS

| 471,175 | 8/1937 | Great Britain. |
| 844,711 | 8/1960 | Great Britain. |
| 870,315 | 6/1961 | Great Britain. |
| 1,320,944 | 2/1963 | France. |

REUBEN EPSTEIN, *Primary Examiner.*

U.S. Cl. X.R.

138—145; 165—135; 176—64, 87